Aug. 7, 1934.　　　　W. L. BALD　　　　1,969,251
PILE POINT
Filed Feb. 3, 1934　　　4 Sheets-Sheet 1

INVENTOR
Warren L. Bald
BY
Marshall T Hawley
ATTORNEYS

Aug. 7, 1934.  W. L. BALD  1,969,251

PILE POINT

Filed Feb. 3, 1934  4 Sheets-Sheet 2

INVENTOR
Warren L. Bald
BY
Marshall & Hawley,
ATTORNEYS

Aug. 7, 1934.   W. L. BALD   1,969,251
PILE POINT
Filed Feb. 3, 1934   4 Sheets-Sheet 3
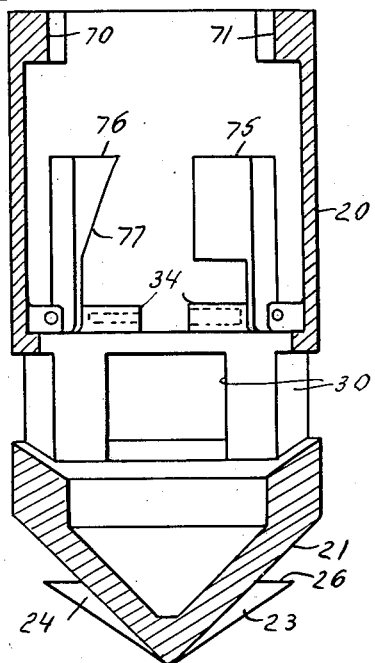
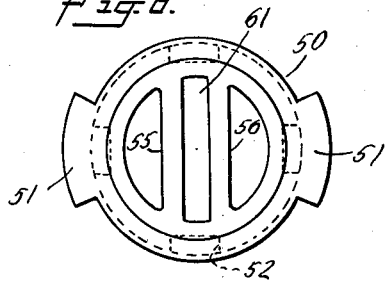
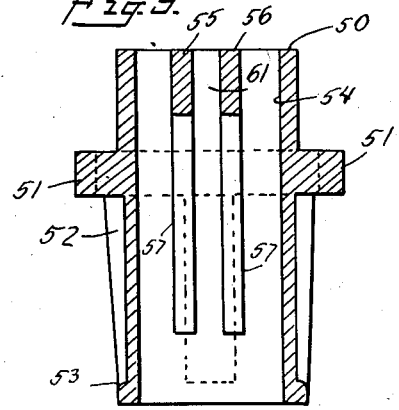
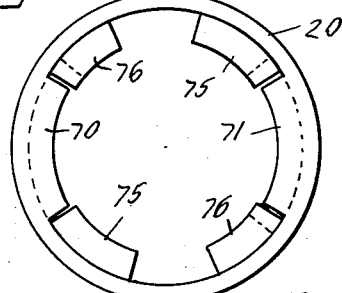
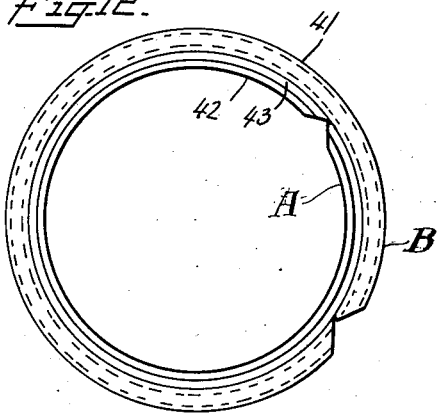
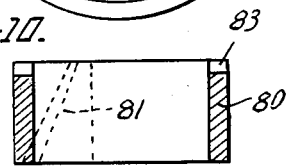
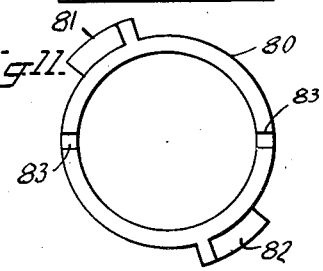
INVENTOR
Warren L. Bald
BY
Marshall & Hawley
ATTORNEYS Aug. 7, 1934.   W. L. BALD   1,969,251
PILE POINT
Filed Feb. 3, 1934   4 Sheets-Sheet 4
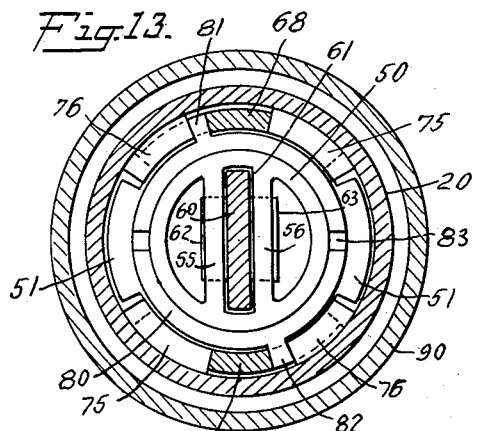
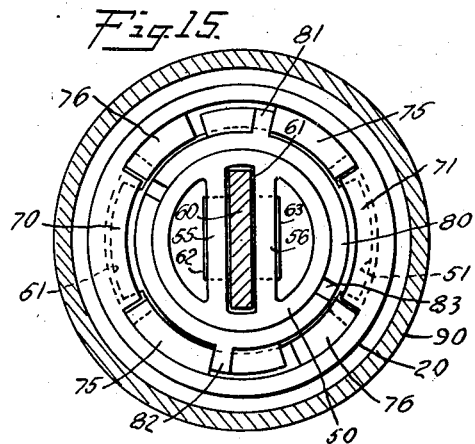
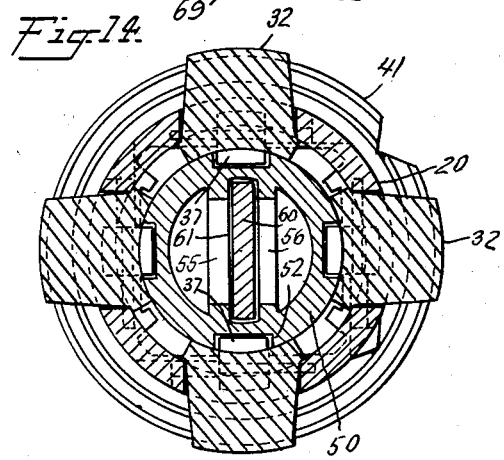
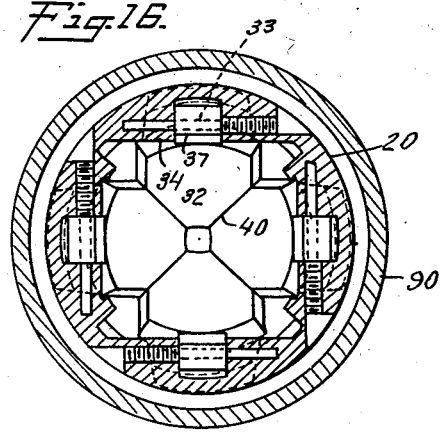
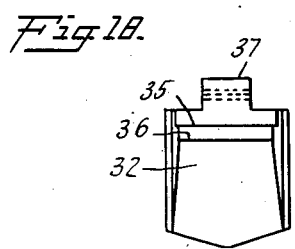
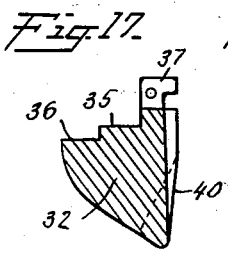
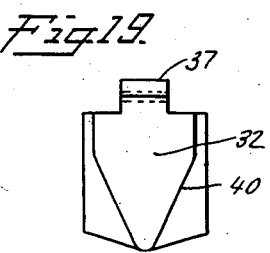
INVENTOR
Warren L. Bald
BY
Marshall & Hawley
ATTORNEYS Patented Aug. 7, 1934

1,969,251

UNITED STATES PATENT OFFICE 1,969,251

PILE POINT

Warren L. Bald, Philadelphia, Pa.

Application February 3, 1934, Serial No. 709,677

20 Claims. (Cl. 61—78)

This invention relates to pile points and particularly to points for hollow piles, so constructed and arranged that they can be pulled up or retrieved after the pile has been driven.

Various types of removable or withdrawable pile points have been designed but it has been found difficult to so construct a point that it can be driven effectively but can be withdrawn after the pile is driven. In certain forms of construction the pile rests on or is supported on lugs or dogs carried by the point, the lugs or dogs being held in their outer or pile supporting position by cams or core blocks or in some other suitable manner.

It is obvious that the intermittent heavy blows of a pile hammer on the pile subject the pile supporting lugs to very severe jars or shocks and in certain types of construction it has been found that the lugs are sometimes loosened and driven into the point, preventing further driving of the pile.

One of the objects of the invention is to provide means for effectively locking the lug holding means against accidental displacement or withdrawal due to the shocks or jars to which the point is subjected.

Another object of the invention is to provide locking means of the character specified, so constructed and arranged that it can be easily and quickly released when desired.

Another object of the invention is to provide means for relieving the lugs or dogs from the direct thrust of the pile, said means being so constructed and arranged that it can be withdrawn with the point after the pile has been driven.

Another object of the invention is to provide a pile point and releasing and withdrawing means therefor, so constructed and arranged that the point can be easily and quickly withdrawn after the pile has been driven.

Another object of the invention is to provide a pile point that is rugged in construction and will stand the severe usage to which such devices are put.

Further objects of the invention will appear from the following specification taken in connection with the drawings which form a part of this application, and in which Fig. 1 is a longitudinal sectional elevation of a pile point mounted in position on the lower end of a pile;

Fig. 6 is a longitudinal sectional elevation through the point;

Fig. 7 is a top plan view of the construction shown in Fig. 6;

Fig. 8 is a top plan view of the core block or lug holding means;

Fig. 9 is a longitudinal sectional elevation of the block;

Fig. 10 is a sectional elevation of the locking ring;

Fig. 11 is a top plan view of the ring shown in Fig. 10;

Fig. 12 is a plan view of the ring which is adapted to rest on the lugs and to support the pile;

Fig. 13 is a transverse sectional elevation taken substantially on line 13—13 of Fig. 1, looking in the direction of the arrows;

Fig. 14 is a transverse sectional elevation taken substantially on line 14—14 of Fig. 1, looking in the direction of the arrows;

Figure 4:
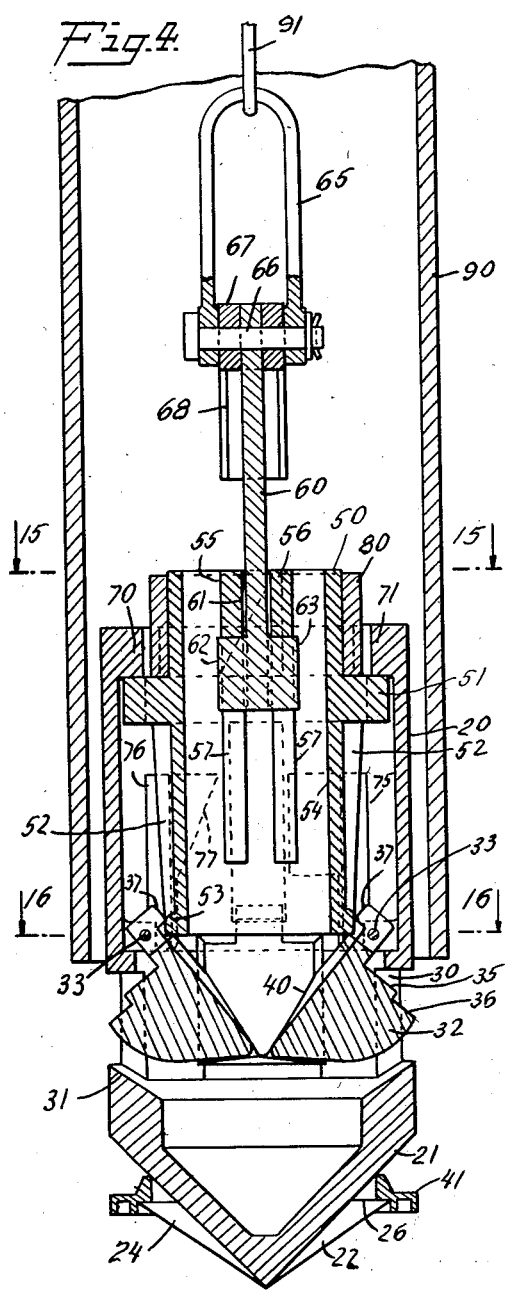
Fig. 4 is a longitudinal sectional elevation similar to Fig. 1 but showing the pile supporting lugs withdrawn into the pile point, the point being shown in a position ready to be pulled upwardly withdrawn from the pile.

Figs. 15 and 16 are transverse sectional elevations taken substantially on lines 15—15 and 16—16 of Fig. 4, looking in the direction of the arrows;

Fig. 17 is a longitudinal sectional elevation of one of the lugs;

Fig. 18 is a front elevation of the lug shown in Fig. 17; and

Fig. 19 is a rear elevation of the lug shown in Fig. 17.

The invention briefly described consists of a removable pile point having a plurality of openings and lugs carried by the point and adapted to extend through the openings. A core block is provided for holding the lugs in extended position and in order to prevent the direct thrust of the pile on the lugs a supporting ring is preferably mounted on the lugs and is adapted to support the pile. Means is provided for releasably locking the core block in lug engaging position in order to prevent accidental displacement of the block and releasing of the lugs during the driving of the pile. The locking means is so constructed and arranged that it will be automatically released when the core is raised to release the lugs. Furthermore, when the lugs are released and the point is withdrawn, the supporting ring which is preferably split will be forced downwardly on the point and means are provided for engaging the ring and supporting it during the withdrawal of the point. The point withdrawing means is so constructed and arranged that as this means is pulled upwardly the locking ring will be automatically released and upward movement of the core block will cause the locking ring to be rotated and released from the coacting locking means carried by the point.

Further details of the invention will appear from the following description.

In the embodiment of the invention illustrated in the drawings, there is shown a pile point having a substantially cylindrical body portion 20 and a tapered lower end 21. The end 21 is provided with tapered projections 22, 23, 24 and 25, the upper ends of which form ledges 26. These projections aid in splitting and breaking substances, such as rocks, in the path of movement of the pile point.

Figure 1:
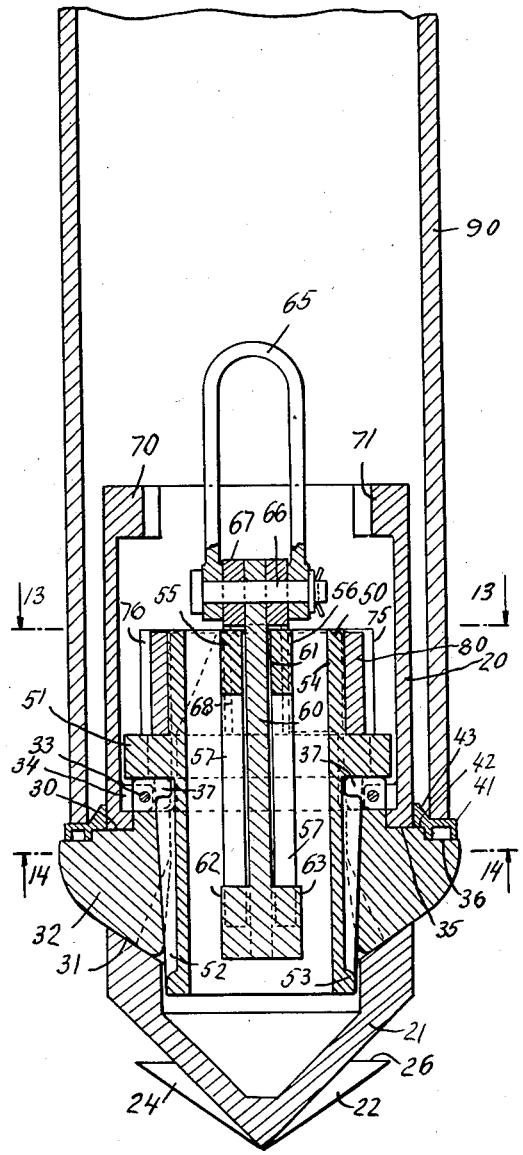
Figure 3:
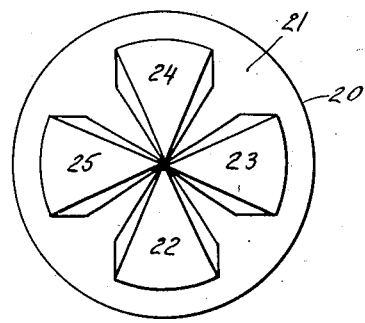
Fig. 3 is a bottom plan view of the point.
Figure 2:
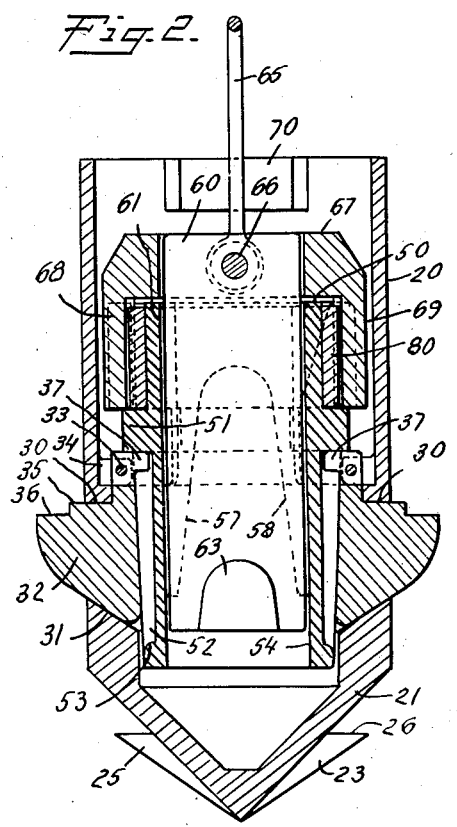
Fig. 2 is a sectional elevation taken at right angles to Fig. 1, the hollow pile or pipe and split ring on which it is supported being omitted.

The point is provided with a plurality of lateral openings 30, the lower edges of the openings being inclined, as shown at 31. A lug or dog 32 is pivoted at 33 to pivot lugs 34 extending into the pile point, each lug having ledges 35 and 36. The lugs 32 are pivoted adjacent the openings 30 and are adapted to extend therethrough, as shown in Figs. 1 and 2. Each lug 32 has formed on the upper end thereof, an inwardly extending dog 37. The inner surfaces of the lugs are preferably tapered, as shown at 40, and the lugs are so pivoted and so constructed and arranged that they can swing inwardly, as shown in Fig. 4, so as to permit the pile point to be drawn upwardly through the pile.

A split ring 41 is mounted on the ledges 36 and has an overhanging portion 42 resting on the ledges 35. The ring is also tapered, as shown at 43. The ends of the ring overlap, as shown in Fig. 12 at A and B, and when the pile point is to be withdrawn the lugs 32 are drawn inwardly in a manner hereinafter described and the ring 41 will be forced longitudinally on the point as the point is drawn upwardly. As the ring reaches the tapered lower end 21 it will contract and will come to rest on the ledges 26 of the projections 22 to 25.

When the pile point is positioned on the bottom of the pile, the lugs 32 are held in their outwardly projecting positions, shown in Figs. 1 and 2, by a core block 50. The core 50 is provided with oppositely extending flanges 51 and also has formed thereon below the flange, radially disposed recesses 52 which receive the dogs 37 of the lugs 32. A bead or shoulder 53 is formed at the lower end of each of the recesses 52. The core has a substantially cylindrical inner surface 54 and a pair of cross bars 55 and 56 extend across the upper end of the core, as shown particularly in Figs. 8 and 9. Webs 57 and 58 extend downwardly along the inner wall of the core from each of the cross bars 55 and 56. The bars 55 and 56 and the webs which connect therewith are disposed parallel to each other, as clearly shown in Figs. 1 and 9. The webs 57 and 58 and the bars 55 and 56 form V-shaped openings, as shown particularly in Fig. 5.

Figure 5:
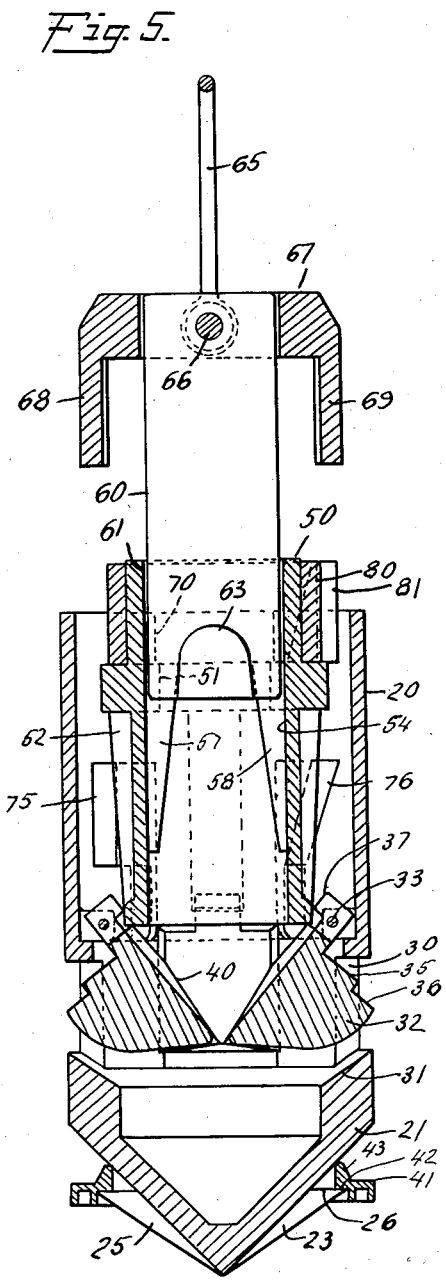
Fig. 5 is a longitudinal sectional elevation taken at right angles to Fig. 4.

A plate 60 is slidably mounted in the opening or slot 61 formed between the bars 55 and 56 and is provided at its lower end with laterally projecting lugs 62 and 63 which are adapted, when the plate is in the elevation position shown in Fig. 5, to engage beneath the bars 55 and 56 and between the webs 57 and 58. The plate is guided in its sliding movement by the bars and also by the parallel webs.

The plate is carried by a U-shaped supporting bail 65, a pin 66 being carried by the lower end of the bail and extending through the plate 60. The pin and bail also support a U-shaped block having a central portion 67 and depending end portions 68 and 69. The central portion 67 is slotted and receives the upper end of the plate 60, as shown in Fig. 1.

The body portion 20 of the pile point is provided at its upper end with inwardly extending oppositely disposed lugs or flanges 70 and 71 adapted for engagement by the flanges 51 of the core block 50 when the core block is raised to the position shown in Fig. 4.

The inner surface of the body portion 20 of the pile point has formed thereon and projecting inwardly therefrom, two sets of lugs 75, 75 and 76, 76. The lugs 75 are substantially rectangular in shape but the lugs 76 are wedge shaped or tapered, as shown at 77 in Fig. 6. From the showing in Fig. 7 it will be noted that the lugs 75, 75 are disposed diametrically opposite each other and this is also true of the lugs 76, 76. Furthermore, the flanges 70 and 71 are disposed between the lugs 75 and 76.

A locking ring 80 is supported on the flanges 51, 51 and surrounds the upper end of the core block 50. This ring is provided with a pair of diametrically opposite outwardly extending tapered projections 81 and 82 and is also notched at diametrically opposite points on its upper edge, as shown at 83. The projections 81 and 82 are wedge shaped or inclined at an angle opposite to the inclination of the surfaces or edges 77 of the lugs 76 which are formed on the inner surface of the body portion 20 of the pile point.

The operation or the use of the pile point will now be described.

*Operation*

The lugs or dogs 32 are projected through the openings 31 in the pile point and the core block 50 is dropped into the pile point with the ring 80 supported on the flanges 51 carried by the core block. The flanges 51 rest on the dogs 37 and assist in holding the lugs 32 in projected position. The ring 80 will be rotated on the flanges 51 by means of a suitable tool, such as a spanner wrench, engaging the notches 3, to such a position that the projections 81 and 82 of the ring will pass downwardly between the inwardly extending lugs 75 and 76 carried by the body portion 20 of the pile point. The ring will then be rotated to a position in which the projections 81 and 82 will engage the inclined surfaces 77 of the lugs 76. When the plate 60 is lowered, the end portions 68 and 69 of the U-shaped block 67 will be positioned between the projections 81 and 82 and the lugs 75 and 76, thus holding the ring 80 against rotational movement on the flanges 51 of the core block. The split ring 41 is mounted on the ledges 35 and 36 formed on the dogs.

It will be obvious that any tendency of the lugs 32 to be displaced inwardly during the driving of the pile, and furthermore, any tendency of the core block 50 to be displaced or to jump upwardly under the successive and intermittent shocks during the driving operation, will be effectively counteracted and prevented by the locking action of the projections 81 and 82 and the lugs 76. The hollow pile 90 will be supported on the ring 41, which in turn is supported by the lugs 32.

After the pile has been driven to the desired depth, the point can be retrived in the following manner: In order to withdraw the point, an upward pull is exerted on the cable 91 which is connected to the U-shaped bail 65 and extends upwardly through the hollow pile. The plate 60 is thus elevated, as shown in Figs. 4 and 5, and as the plate is raised the block 67 and downwardly extending ends 68 and 69 are also elevated. As the block 67 is raised, the portions 68 and 69 will be withdrawn from between the lugs 75 and the projections 81, 82. When the plate 60 has been raised to the position shown in Figs. 4 and 5, the lugs 62 and 63 engage beneath the bars 55 and 56 and raise the core block 50. As the block is raised, the pivoted lugs 32 will be released and the beads or projections 53 at the lower ends of the longitudinal grooves 52 will engage the dogs 37 on the lugs 32 and swing the lugs inwardly. Furthermore, as the core block is raised from the position shown in Fig. 1 to the position shown in Figs. 4 and 5, the ring 80 will be rotated by the engagement of the inclined surfaces 77 on the lugs 76 and the correspondingly inclined surfaces on the projections 81 and 82. This is permitted since the ends 68 and 69 of the block 67 have been withdrawn, as above stated.

When the lugs 32 are withdrawn through the openings 31 in the pile point, the split ring 41 will be released, and as the point is raised the engagement between the ring 41 and the lower end of the hollow pile will force the ring downwardly on the point and when the ring reaches the tapered lower end of the point it will contract and will come to rest on the ledges 26 formed on the upper ends of the projections 22, 23, 24 and 25. As the pull on the cable 91 is continued, the engagement of the flanges 51 beneath the lugs 70 and 71 on the pile point will cause the pile point to be raised.

From the foregoing description it will be clear that as the cable 91 is pulled upwardly, the locking ring 80 will be automatically released and continued upward pull on the cable will cause the core block to be elevated, the lugs 32 to be withdrawn, and the point to be pulled upwardly through the hollow pile. In other words, a single operation is necessary to retrieve the pile point.

Furthermore, it should be clear that the lugs 32 and core block 50 will be effectively locked in position during the driving operation and will be prevented from accidental displacement due to the jarring and shocks caused by the operation of the pile hammer.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. A pile point having a plurality of openings therein, a lug movable into each of said openings and adapted to extend therethrough to form a support for a hollow pile, a core block movable into position to engage said lugs and hold the lugs in supporting position, and means for locking said block in operative position.

2. A pile point having a plurality of openings therein, a lug movable into each of said openings and adapted to extend therethrough to form a support for a hollow pile, a core block movable into position to engage said lugs and hold the lugs in supporting position, and means for locking said block in operative position, said locking means being automatically released as the point is withdrawn from the pile.

3. A pile point having a plurality of openings therein, a lug movable into each of said openings and adapted to extend therethrough to form a support for a hollow pile, a core block movable into position to engage said lugs and hold the lugs in supporting position, and means including a ring carried by said block for locking said block in operative position.

4. A pile point having a plurality of openings therein, a lug movable into each of said openings and adapted to extend therethrough to form a support for a hollow pile, a core block movable into position to engage said lugs and hold the lugs in supporting position, and means including a ring carried by said block, and coacting means in the pile point for locking said block in operative position.

5. A pile point having a plurality of openings therein, a lug movable into each of said openings and adapted to extend therethrough to form a support for a hollow pile, a core block movable into position to engage said lugs and hold the lugs in supporting position, and means including rotatable means carried by the core block, and coacting means in the pile point for locking said block in operative position.

6. A pile point having a plurality of openings therein and lugs adapted to project through said openings, a vertically movable core block adapted to engage said lugs and hold the lugs in operative position, and coacting means carried by the core block and pile point for locking the block in lug engaging position.

7. A pile point having a plurality of openings therein and lugs adapted to project through said openings, a vertically movable core block adapted to engage said lugs and hold the lugs in operative position, coacting means carried by the core block and pile point for locking the block in lug engaging position, and means for holding said coacting means in locking position.

8. A pile point having a plurality of openings therein and lugs adapted to project through said openings, a vertically movable core block adapted to engage said lugs and hold the lugs in operative position, coacting means carried by the core block and pile point for locking the block in lug engaging position, and vertically movable means for holding said coacting means in locking position.

9. A pile point having a plurality of openings therein and lugs adapted to project through said openings, a vertically movable core block adapted to engage said lugs and hold the lugs in operative position, and coacting wedge-shaped means carried by the core block and pile point for locking the block in lug engaging position.

10. A pile point having a plurality of openings therein and lugs adapted to project through said openings, a vertically movable core block adapted to engage said lugs and hold the lugs in operative position, coacting means carried by the core block and pile point for locking the block in lug engaging position, means for raising said core block and pile point, and means movable with said raising means for holding said coacting means in locking position.

11. A pile point having a plurality of openings therein and lugs adapted to project through said openings, a vertically movable core block adapted to engage said lugs and hold the lugs in operative position, coacting means carried by the core block and pile point for locking the block in lug engaging position, means for raising said core block and pile point, and means movable with said raising means for holding said coacting means in locking position, said holding means being moved out of operative position as said raising means is operated to raise the core and point.

12. In combination, a pile point having a plurality of openings therein, lugs adapted to project through said openings, and an expansible and contractible ring adapted to rest on said lugs.

13. In combination, a pile point having a plurality of openings therein, lugs adapted to project through said openings, an expansible and contractible ring adapted to rest on said lugs, and means on said pile point for supporting said ring when the lugs are retracted and the point is raised.

14. In combination, a pile point having a plurality of openings therein, lugs adapted to project through said openings, a ring adapted to rest on said lugs, and projecting means on said pile point for breaking up material in the path of movement of the pile point as said point is driven.

15. In combination, a pile point having a plurality of openings therein, lugs adapted to project through said openings, a core block for holding the lugs in projected position, and means on the core block engageable with the lugs for engaging and retracting the lugs as the core block is raised.

16. In combination, a pile point having a plurality of openings therein, lugs adapted to project through said openings, dogs on said lugs positioned within the point, and a core block adapted to rest on said dogs and to hold said lugs in projected position, said block being movable away from the dogs as the block is raised.

17. In combination, a pile point having a plurality of openings therein, lugs adapted to project through said openings, dogs on said lugs positioned within the point, a core block adapted to rest on said dogs and to hold said lugs in projected position, and means for holding said core block in lug engaging position.

18. In combination, a pile point having a plurality of openings therein, lugs adapted to project through said openings, dogs on said lugs positioned within the point, a core block adapted to rest on said dogs and to hold said lugs in projected position, and means on the core block engageable with the dogs to swing the lugs inwardly when the core block is raised.

19. A pile point having a plurality of openings therein, a lug movable into each of said openings and adapted to extend therethrough to form a support for a hollow pile, a core block movable into position to engage said lugs and hold the lugs in supporting position, means for locking said block in operative position, and means carried by the core block operatable successively to release said locking means and to raise the core block and pile point.

20. A pile point having a plurality of openings therein, a lug movable into each of said openings and adapted to extend therethrough to form a support for a hollow pile, a core block movable into position to engage said lugs and hold the lugs in supporting position, means for locking said block in operative position, and vertically movable means carried by the core block operatable successively to release said locking means and to raise the core block and pile point.

WARREN L. BALD.